United States Patent [19]

Asawa et al.

[11] Patent Number: 4,528,058

[45] Date of Patent: Jul. 9, 1985

[54] METHOD OF BONDING ION EXCHANGE MEMBRANE OF FLUORINATED POLYMER TO SYNTHETIC RESIN

[75] Inventors: Tatsuro Asawa; Tsuneji Ishii; Tomoki Gunjima, all of Yokohama, Japan

[73] Assignee: Asahi Glass Company Ltd., Tokyo, Japan

[21] Appl. No.: 473,982

[22] Filed: Mar. 16, 1983

Related U.S. Application Data

[63] Continuation of Ser. No. 199,249, Oct. 21, 1980, abandoned.

[30] Foreign Application Priority Data

Nov. 13, 1979 [JP] Japan .............................. 54-146055

[51] Int. Cl.$^3$ ............................. C09J 5/00; C09J 7/00
[52] U.S. Cl. ................................. 156/306.6; 156/313; 428/421
[58] Field of Search ............... 427/407.1, 412.1, 412.3, 427/412.4, 400, 412, 302; 428/421, 422, 247; 204/128, 98, 296; 156/306.6, 333, 313, 334

[56] References Cited

U.S. PATENT DOCUMENTS

| | | | |
|---|---|---|---|
| 3,697,306 | 10/1972 | Miller | 427/412.3 |
| 3,946,136 | 3/1976 | Fitz et al. | 156/306.6 |
| 3,993,827 | 11/1976 | Dukert et al. | 156/306.6 |
| 4,000,348 | 12/1976 | Harlow | 156/333 |
| 4,165,248 | 8/1979 | Darlington et al. | 156/306.6 |
| 4,206,022 | 6/1980 | Gunjima et al. | 204/98 |
| 4,225,400 | 9/1980 | Gunjima et al. | 204/296 |
| 4,318,785 | 3/1982 | Gunjima et al. | 428/421 |

FOREIGN PATENT DOCUMENTS 80304077.3 12/1982 European Pat. Off. .

Primary Examiner—Sadie L. Childs
Attorney, Agent, or Firm—Oblon, Fisher, Spivak, McClelland & Maier

[57] ABSTRACT

An ion exchange membrane of a fluorinated polymer is bonded to a synthetic resin with a binder selected from the group consisting of fluorinated polymers, polyolefins and polyaryl ethers. The binder is in a form of a net, a cloth or a porous sheet so as to form an uneven interlayer.

7 Claims, No Drawings

METHOD OF BONDING ION EXCHANGE MEMBRANE OF FLUORINATED POLYMER TO SYNTHETIC RESIN

This application is a continuation of application Ser. No. 199,249, filed Oct. 21, 1980, now abandoned.

BACKGROUND OF THE INVENTION

1. Field of the Invention

The present invention relates to a method of bonding an ion exchange membrane of a fluorinated polymer to a synthetic resin. More particularly, it relates to a method of bonding an ion exchange membrane of a fluorinated polymer to a synthetic resin with a binder in a form of a net, cloth or porous sheet by heat welding methods.

2. Description of the Prior Art

The ion exchange membrane of a fluorinated polymer is not easily bonded to others even the same membrane. It has been known that only when the ion exchange groups are carboxylic acid groups or ester groups, a bonding with a strength to be practically used can be given. If the ion exchange membrane of a fluorinated polymer is easily bonded to the other synthetic resin product, the synthetic resin part can be used for fitting to a desired equipment. The effective area of the ion exchange membrane can be larger or the ion exchange membrane can be easily processed in a fabrication such as a fabrication by bonding the ion exchange membrane in a bag form.

The strength of the bonded part at the bonding is remarkably high when the ion exchange groups are carboxylic acid groups or ester groups, however the strength of the bonded part becomes weak when the laminated ion exchange membrane is used for an electrolysis of an aqueous solution of sodium chloride because the ion exchange groups are converted into sodium salt groups.

The inventors have studied to find a method of bonding firmly the ion exchange membrane of a fluorinated polymer to the other synthetic resin for a long time without substantial adverse effect of kind of the ion exchange groups.

SUMMARY OF THE INVENTION

It is an object of the present invention to provide a method of bonding firmly an ion exchange membrane of a fluorinated polymer to the other synthetic resin with high strength which is not substantially deteriorated.

The foregoing and other objects of the present invention have been attained by holding a specific polymer product as a binder between the ion exchange membrane and the synthetic resin product and heat-melt bonding them under a pressure preferably by heat welding methods.

DETAILED DESCRIPTION OF THE PREFERRED EMBODIMENTS

The specific polymers used for the binder are preferably fluorinated polymers, polyolefins and polyaryl ethers as alkaline resistant polymers.

Suitable fluorinated polymers include polytetrafluoroethylene, polytrifluorochloroethylene, copolymer of tetrafluoroethylene and hexafluoropropylene, copolymers of tetrafluoroethylene and perfluorovinyl ether, polyvinylidenefluoride, copolymers of tetrafluoroethylene and ethylene, copolymers of tetrafluoroethylene and vinylidenefluoride and copolymers of tetrafluoroethylene and propylene.

In these copolymers, the copolymers of 90 to 99 mol % of tetrafluoroethylene and 10 to 1 mol % of hexafluoropropylene; the copolymers of 80 to 99 mol % of tetrafluoroethylene and 20 to 1 mol % of perfluorovinyl ether; the copolymers of 48 to 55 mol % of tetrafluoroethylene and 45 to 52 mol % of ethylene; the copolymers of 45 to 60 mol % of tetrafluoroethylene and 40 to 55 mol % of vinylidene fluoride and the copolymers of 45 to 55 mol % of tetrafluoroethylene and 45 to 55 mol % of propylene are preferably used since the bonding having high strength and high durability can be expected.

As the polyvinylidene fluoride, the polymers having a molecular weight of about $10 \times 10^4$ to $100 \times 10^4$ is preferably used since the bonding having high strength and high durability can be expected.

Among these fluorinated polymers, the copolymers of tetrafluoroethylene and hexafluoropropylene; copolymers of tetrafluoroethylene and perfluorovinyl ether; and copolymers of tetrafluoroethylene and ethylene are preferably used since the bonding having especially high strength and durability can be expected.

Suitable polyolefins include high density polyethylenes having a molecular weight of about $10 \times 10^4$ to $50 \times 10^4$; low density polyethylenes having a molecular weight of about $50 \times 10^4$ to $10 \times 10^4$; polypropylenes having a molecular weight of about $5 \times 10^4$ to $50 \times 10^4$ and polymethylpentenes.

Among them, polypropylene and polymethylpentene are preferably used in view of high strength and high durability.

Suitable polyaryl ethers include polyphenyleneoxides and polysulfones.

In the method of the present invention, the polymers used as the binder are usually used in a desired form such as an emboss film, punched film, a net, a cloth and a porous sheet. It is the optimum to use the binder in a form of a net or cloth in view of high strength. In this case, it is preferable to use it in a form of a net or cloth having a thickness of 250 to 25µ; deniers of 50 to 500 and mesh of 15 to 500. It is not suitable to use the net or cloth having the physical properties out of said ranges since satisfactory strength or durability may not be given.

The kinds of the synthetic resin of the substrate used for bonding to the ion exchange membrane of a fluorinated polymer are preferably the same as that of the binder. Such synthetic resin substrate can be in a form of a film, a plate, a porous product, or a net etc. Such synthetic resin may be sometimes used as a binder itself together with the substrate.

When the kind of the synthetic resin of the substrate is different from that of the binder, it is preferable to select a combination of them so as to give a bonding strength of higher than 1 kg./2.5 cm. These combinations may be given by selecting combination of polytetrafluoroethylene, and a copolymer of tetrafluoroethylene and perfluoropropylvinyl ether or combination of a copolymer of propylene and ethylene and polypropylene, etc.

In the method of the present invention, the method of bonding the ion exchange membrane of a fluorinated polymer to the synthetic resin substrate with the binder, it is preferable to employ a heat welding method. The bonding condition is preferably a temperature of 120° to 350° C.; a pressure of 0.5 to 100 kg./cm² and a time of 5 seconds to 5 minutes. In the heat welding, it is possible to use a desired machine such as a ultrasonic bonding machine, an impulse heater, heat bar and a heat-press machine.

In the method of the present invention, unevenness having a pitch of less than 2 mm and a depth of more than $20\mu$ are formed in the interlayer between the binder and the ion exchange membrane of a fluorinated polymer whereby anchor effect is imparted so as to give further higher bonding strength.

Such condition can be attained by the combination of the above-mentioned machine and a melt-bonding condition. Thus, it is not critical and it is possible to previously form the unevenness by a known desired method.

The ion exchange membrane of a fluorinated polymer used in the present invention are made of a fluorinated polymer having carboxylic acid groups, $-SO_2F$ groups, phosphoric acid groups or $C_1$-$C_{20}$ alkyl or aryl ester groups as the ion exchange groups. It is preferable to use a copolymer of a vinyl monomer such as tetrafluoroethylene and chlorotrifluoroethylene and a perfluorovinyl monomer having said ion exchange groups.

The cation exchange membrane is preferably made of a fluorinated polymer having the following units

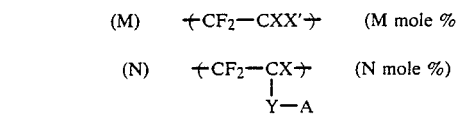

wherein X represents fluorine, chlorine or hydrogen atom or $-CF_3$; $X'$ represents X or $CF_3(CF_2)_m$; m represents an integer of 1 to 5.

The typical examples of Y have the structures bonding A to a fluorocarbon group such as

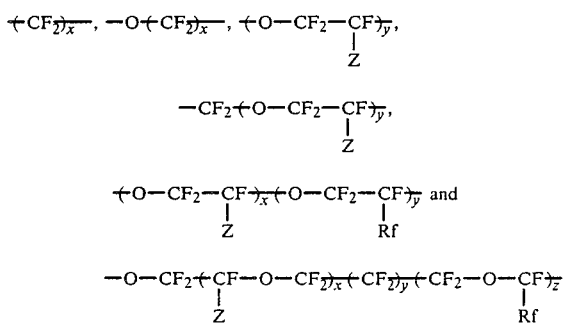

x, y and z respectively represent an integer of 1 to 10; Z and Rf represent $-F$ or a $C_1$-$C_{10}$ perfluoroalkyl group; and A represents $-COOM$ or $-SO_3M$, or a functional group which is convertible into $-COOM$ or $-SO_3M$ by a hydrolysis or a neutralization such as $-CN$, $-COF$, $-COOR_1$, $-SO_2F$, $-CONR_2R_3$ and $-SO_2NR_2R_3$ and M represents hydrogen or an alkali metal atom; $R_1$ represents a $C_1$-$C_{10}$ alkyl group; $R_2$ and $R_3$ represent H or a $C_1$-$C_{10}$ alkyl group.

In the method of the present invention, it is preferable to use an ion exchange membrane of a fluorinated polymer having an ion exchange capacity of carboxylic acid groups of 0.5 to 4.0 meq./g. dry resin preferably 0.8 to 2.0 meq./g. dry resin and $T_Q$ (a temperature for a volumetric melt flow rate of 100 m$^3$/sec.) of 130° to 350° C. preferably 160° to 280° C. since the bonding having high strength and high durability can be attained. When a cation exchange membrane having said property is used for an electrolysis of an aqueous solution of sodium chloride, a current efficiency can be higher than 90% even though a concentration of sodium hydroxide is higher than 40%.

The copolymers having the units of (a) and (b) preferably comprises 1 to 40 mol %, especially 3 to 20 mol % of the units of (b) so as to give the above-mentioned range of the ion exchange capacity of the membrane.

The cation exchange membrane used in the method of the present invention is made of a non-crosslinked copolymer formed by said fluorinated olefin units and monomer units having carboxylic acid groups or functional groups which are convertible into carboxylic acid groups. The molecular weight of the copolymer is preferably in a range of about $10 \times 10^4$ to $200 \times 10^4$ especially $15 \times 10^4$ to $100 \times 10^4$.

In the preparation of the copolymers, it can be modified by using said two or more monomers and adding a third monomer. For example, the flexibility is imparted by combining $\alpha$-olefin compound such as ethylene, propylene, and butene and $CF_2=CFOR_f$ wherein $R_f$ represents a $C_1$-$C_{10}$ perfluoroalkyl group. For example, improved mechanical strength can be imparted by crosslinking the copolymer by combining a divinyl monomer such as $CF_2=CF-CF=CF_2$, $CF_2=CFO(CF_2)_{1-3}CF=CF_2$.

The copolymerization of the fluorinated olefin with the comonomer having the carboxylic acid groups or the functional groups which are convertible to carboxylic acid group or the third monomer, can be carried out by suitable conventional methods.

The copolymerization can be carried out by a catalytic polymerization, a thermal polymerization or a radiation-induced polymerization by using a solvent such as halogenated hydrocarbons, if necessary.

The cation exchange membrane of the fluorinated polymer can be prepared by the conventional process for fabricating a membrane such as a press-molding method, a roll-molding method, an extrusion method, a solution spreading method, a dispersion molding method and a powder molding method, to give a thickness of 20 to $600\mu$ preferably 50 to $400\mu$.

When the copolymer having functional groups which can be converted to carboxylic acid groups is produced, the functional groups should be converted to carboxylic acid groups by suitable treatment before or after the step of fabrication of membrane. For example, when the functional groups are $-CN$, $-COF$, $-COOR_1$, $-COOM$, $-CONR_2R_3$ wherein M and $R_1$ to $R_3$ are defined above, the functional groups are converted to carboxylic acid groups by hydrolysis or neutralization with an alcohol solution of an acid or a base. When the functional groups are double bonds, they are converted to carboxylic acid groups after reacting them with $COF_2$.

The cation exchange membrane of the fluorinated polymer can be produced by blending a polymer of olefin such as polyethylene polypropylene, preferably, polytetrafluoroethylene or a fluorinated copolymer of ethylene and tetrafluoroethylene to the carboxylic acid type fluorinated polymer in the step of fabrication of the membrane. It is also possible to reinforce the cation exchange membrane with a supporter of a fabric such as a cloth and a net; a nonwoven fabric or a porous film which is made of said polymer.

The present invention will be further illustrated by certain examples and references which are provided for purposes of illustration only and are not intended to be limiting the present invention.

In the examples, the bonding strength was measured by Japanese Industrial Standard K-6654 to give an average value of data at 5 points at 25° C.

EXAMPLE 1

In a bonding of a film made of a copolymer of ethylene and tetrafluoroethylene having a thickness of 100μ to an ion exchange membrane made of a copolymer of $C_2F_4$ and $CF_2=CF-O(CF_2)_3COOCH_3$ having an ion exchange capacity of 1.45 meq./g. dry resin and $T_Q$ (a temperature for a volumetric melt flow rate of 100 mm²/sec.) of 230° C. and a thickness of 250μ by an impulse heater, a cloth made of warps of 100 deniers and 50 mesh and wefts of 100 deniers and 50 mesh made of a copolymer of 48 mol % of ethylene and 52 mol % of tetrafluoroethylene as a binder was held between the fluorinated polymer ion exchange membrane and the ethylene-tetrafluoroethylene copolymer film and they were bonded under a pressure of 5 kg./cm² at 280° C. for 15 seconds.

According to the microscopic observation of a sectional view of the laminated product, the interlayer between the fluorinated polymer ion exchange membrane and the ethylene-tetrafluoroethylene copolymer film had unevenness of about 70μ.

The laminated product was immersed into 25% NaOH aqueous solution at 90° C. to convert the ion exchange groups into sodium salt form.

A peeling strength between the Na type fluorinated ion exchange membrane and the ethylene-tetrafluoroethylene copolymer film was measured. As a result, it was 4.4 kg.

EXAMPLE 2

In a bonding of a film made of polypropylene having a thickness of 200μ to a methyl ester type fluorinated polymer ion exchange membrane of Example 1, by an impulse heater, a cloth made of warps of 80 deniers and 60 mesh and wefts of 100 deniers and 60 mesh made of polypropylene as a binder was held between them and they were bonded under a pressure of 5 kg./cm² at 180° C. for 30 seconds. According to the microscopic observation of a sectional view of the laminated product, the interlayer had unevenness of 63μ. The peeling strength was 4.6 kg.

EXAMPLE 3

In a bonding of a film made of a copolymer of tetrafluoroethylene and hexafluoropropylene (PFA: tradename of DuPont) having a thickness of 100μ to the methyl ester type fluorinated polymer ion exchange membrane of Example 1 by an impulse heater, a cloth made of warps of 150 deniers and 60 mesh and wefts of 150 deniers and 60 mesh made of a copolymer of tetrafluoroethylene as a binder was held between them and they were bonded under a pressure of 10 kg./cm² at 320° C. for 15 seconds. According to the microscopic observation of a sectional view of the laminated product, the interlayer had unevenness of 60μ. The peeling strength was 1.6 kg.

REFERENCE 1

In accordance with the process of Example 1 except that any binder was not used, the fluorinated polymer ion exchange membrane was bonded to the ethylene-tetrafluoroethylene copolymer film. According to the microscopic observation of the sectional view of the laminated product, the interlayer had unevenness of 18μ. The peeling strength was remarkably small as 0.6 kg.

REFERENCE 2

In accordance with the process of Example 2 except that any binder was not used, the fluorinated polymer ion exchange membrane was bonded to the polypropylene film. According to the microscopic observation of the sectional view of the laminated product, the interlayer had unevenness of 10μ. The peeling strength was remarkably small as 0.5 kg.

EXAMPLE 4

In a bonding of a film made of a polysulfone having a thickness of 50μ to the methyl ester type fluorinated polymer ion exchange membrane of Example 1 by an heat bar having a thickness of 50μ and a width of 10 mm and having holes (a diameter of 1 mm) at a density of 36 holes/cm², a polysulfone film as a binder was held between them and they were bonded under a pressure of 10 kg./cm² at 310° C. for 60 seconds. According to the microscopic observation of a sectional view of the laminated product, the interlayer had unevenness of 65μ. The laminated product was immersed into 25% NaOH aqueous solution at 90° C. to convert the ion exchange groups into sodium soft form. The peeling strength was 2.1 kg.

We claim:

1. A method of bonding an ion exchange membrane of a fluorinated polymer having ion exchange groups to a synthetic resin, comprising:

bonding said membrane to said synthetic resin with a binder being in the form of a cloth having a thickness of 25 to 250μ, a denier of 50 to 500 and a mesh of 15 to 500, and formed of a material selected from the group consisting of polyaryl ethers, polyolefins and fluorinated polymers selected from the group consisting of polytetrafluoroethylene, polytrifluorochloroethylene, copolymers of tetrafluoroethylene and hexafluoropropylene, copolymers of tetrafluoroethylene and perfluorovinyl ether, polyvinylidene fluoride copolymers of tetrafluoroethylene and ethylene, copolymers of tetrafluoroethylene and vinylidene fluoride and copolymers of tetrafluoroethylene and propylene, said synthetic resin being selected from the same group of materials which constitute said binder and wherein interlayer between said binder and ion exchange membrane has an unevenness characterized by a pitch of less than 2 mm and a depth of more than 20 microns.

2. The method of claim 1, wherein said fluorinated polymer exchange membrane has ion exchange groups selected from the group consisting of carboxylic acid groups, carboxylic acid $C_1$-$C_{20}$ alkyl ester or aryl ester groups, —$SO_2F$ groups and phosphoric acid groups.

3. The method of claim 1, wherein said binder is a polyolefin selected from the group consisting of high density polyethylene, low density polyethylene, polypropylene and polymethylpentene.

4. The method of claim 1, wherein said binder is a polyaryl ether selected from the group consisting of polyphenylene oxide and polysulfone.

5. The method of claim 1, wherein said bonding is conducted under a pressure of 0.5 to 100 kg/cm² and at a temperature of 120° to 350° C., which is higher than the softening point of the binder, as achieved by an impulse heater.

6. The method of claim 1, wherein said polyvinylidenefluoride has a molecular weight of about $10\times10^4$ to $100\times10^4$.

7. The method of claim 1, wherein said ion exchange membrane has free carboxylic acid groups of an ion exchange capacity of 0.5 to 4.0 meq/gram dry resin and a volumetric flow rate of 100 m$^3$/sec at a temperature of 130° to 350° C.

* * * * *